United States Patent

[11] 3,584,207

[72] Inventors Oleg Avsan
Huddinge;
Fritz Gustav Torsten Hjalm, Skarholmen,
both of, Sweden

[21] Appl. No. 753,631

[22] Filed Aug. 19, 1968

[45] Patented June 8, 1971

[73] Assignee Telefonaktiebolaget L M Ericsson
Stockholm, Sweden

[32] Priority Sept. 8, 1967

[33] Sweden

[31] 12432/1967

[54] ARRANGEMENT FOR CARRYING OUT ALTERNATIVELY ADDITION OR ONE OF A NUMBER OF LOGICAL FUNCTIONS BETWEEN THE CONTENTS IN A POSITION OF TWO BINARY WORDS

2 Claims, No Drawings

[52] U.S. Cl. .......... 235/175, 235/173, 307/215

[51] Int. Cl. .......... G06f 7/38, G06f 7/385

[50] Field of Search .......... 235/173, 175, 176; 307/214, 215, 216

[56] References Cited

UNITED STATES PATENTS

| | | | |
|---|---|---|---|
| 3,291,973 | 12/1966 | Rasche .......... | 235/176 |
| 3,296,424 | 1/1967 | Cohn .......... | 235/176X |
| 3,440,413 | 4/1969 | Betts .......... | 235/176 |
| 3,458,240 | 7/1969 | Hanson .......... | 307/215X |
| 3,465,133 | 9/1969 | Booher .......... | 235/175 |

*Primary Examiner*—Malcolm A. Morrison
*Assistant Examiner*—James F. Gottman
*Attorney*—Hane and Baxley

ABSTRACT: There is disclosed a multicell arithmetic unit which can either perform an addition of two binary words or one of a plurality of logical operations on the two binary words. Each cell of the unit processes one position of the operands and has a carry input, inputs for the operands, inputs for the complements of the operands, an input indicating addition and inputs indicating logical functions. Four NAND gates have pairs of inputs connected to combinations of the operand inputs and the complements of the operand inputs. The inputs of the NAND gates are controlled by logical networks which receive signals from the inputs indicating addition, indicating logical functions and the carry input. The output of a cell is the output of a four-input AND circuit whose inputs are connected to the different outputs of the NAND circuits.

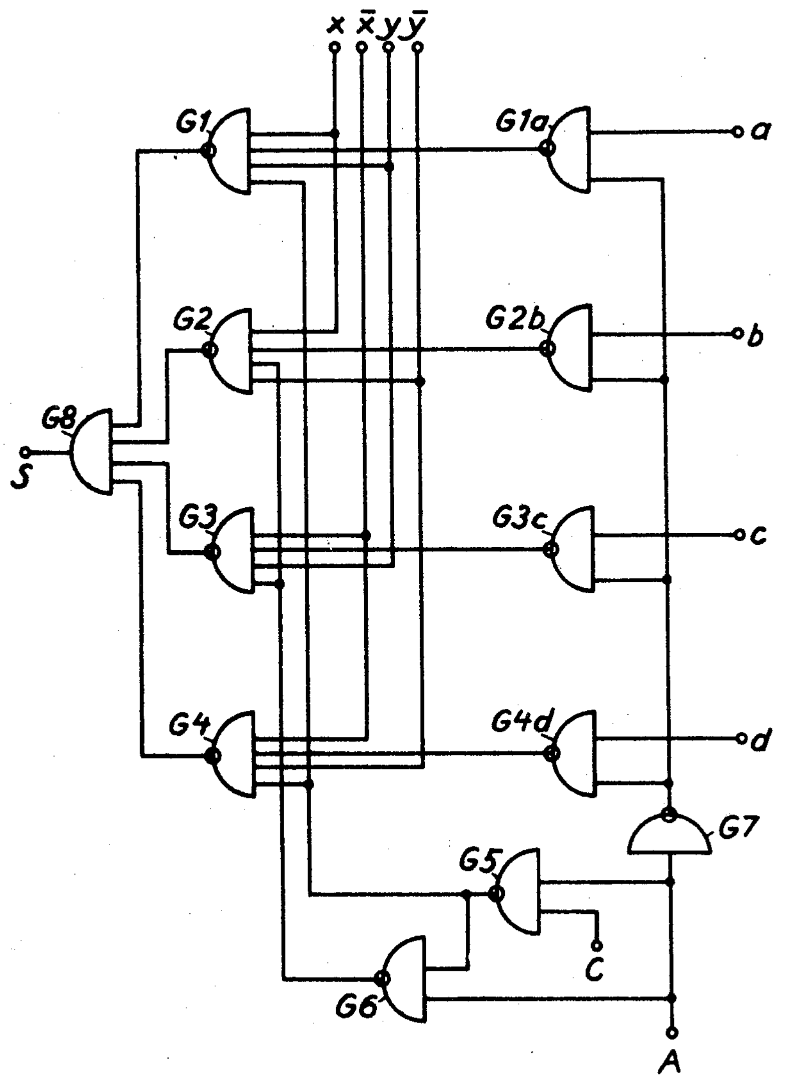

Figure 1:
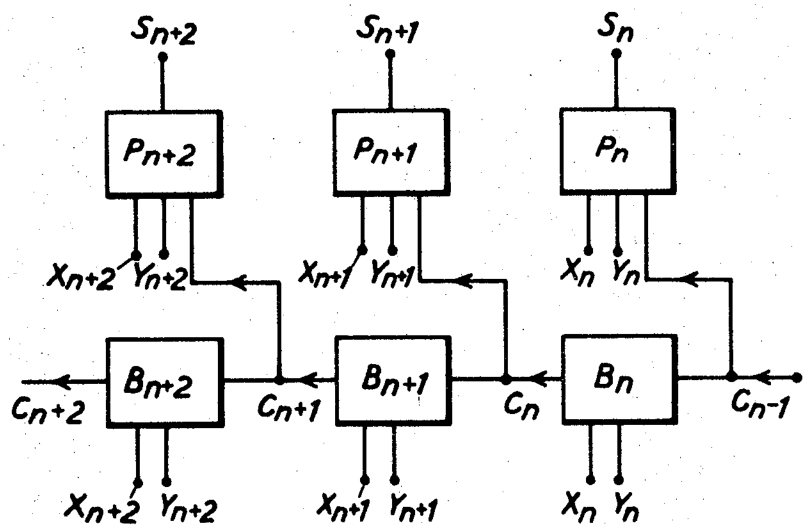

INVENTORS
Oleg Avsan
Fritz Gustav Torsten Hjälm
BY Hane and Baxley
ATTORNEYS

INVENTORS
OLEG AVSAN
FRITZ GUSTAV TORSTEN HJALM
BY Hane and Baxley
ATTORNEYS

ARRANGEMENT FOR CARRYING OUT ALTERNATIVELY ADDITION OR ONE OF A NUMBER OF LOGICAL FUNCTIONS BETWEEN THE CONTENTS IN A POSITION OF TWO BINARY WORDS

The arithmetic unit of a computer is generally required, in addition to performing algebraic additions, to carry out other logical operations, for instance AND-, OR- and EXCLUSIVELY-OR operations between the contents in a certain position of two binary words. This may be carried out in such a way that a number of circuits are connected in parallel with the usual summing circuits for attending to the other logical operations. The total number of circuits in the arithmetic unit will then, however, be relatively large. Therefore it has also been proposed to use the same circuits, which by means of control signals may be switched to perform the different logical functions as well as the summing function. An object of the present invention is to provide an arrangement of the last-mentioned kind and to provide thereby an arrangement having the smallest possible number of consecutive groups of circuits. It is another object of the invention to provide such an arrangement wherein the same circuits can thus be used for addition as well as for the other logical operations and wherein the operation to be carried out is determined by the input conditions at a numb er of control inputs, which conditions can be made different for different bits in the operand binary words, so that different operations may be carried out with different portions of the words. The invention is characterized in that it has four operand inputs to which the binary content, and the complement of the contents respectively are supplied, four control inputs, the binary condition of which determines one of maximum 16 logical operations, a carry bit input and an addition determining input. The arrangement comprises a first group of four NAND circuits (i.e. AND circuits with inverting outputs). One input of each circuit is one of the control inputs and the other input is connected, via a NOT circuit, to the addition determining input. There are a second group of four NAND circuits, which all have one of their inputs connected to the output of a different one of the NAND circuits in the first group and have two of their inputs connected to a combination, specific for each circuit, of two operand inputs, one from each word. A fourth input of the two NAND circuits in the second group, to which only complementary or only non-complimentary binary contents are supplied, is connected to the addition determining input via a first further NAND circuit having another input connected to the carry bit input. The fourth input of the other two NAND circuits in the second group is connected to the output of the second further NAND circuit, one input of which is connected to the addition determining input, and the other input of which is connected to the output of the first further NAND circuit. The outputs of the second group of NAND circuits form the inputs of an AND circuit, the output of which constitutes the output of the arrangement.

Figure 2:
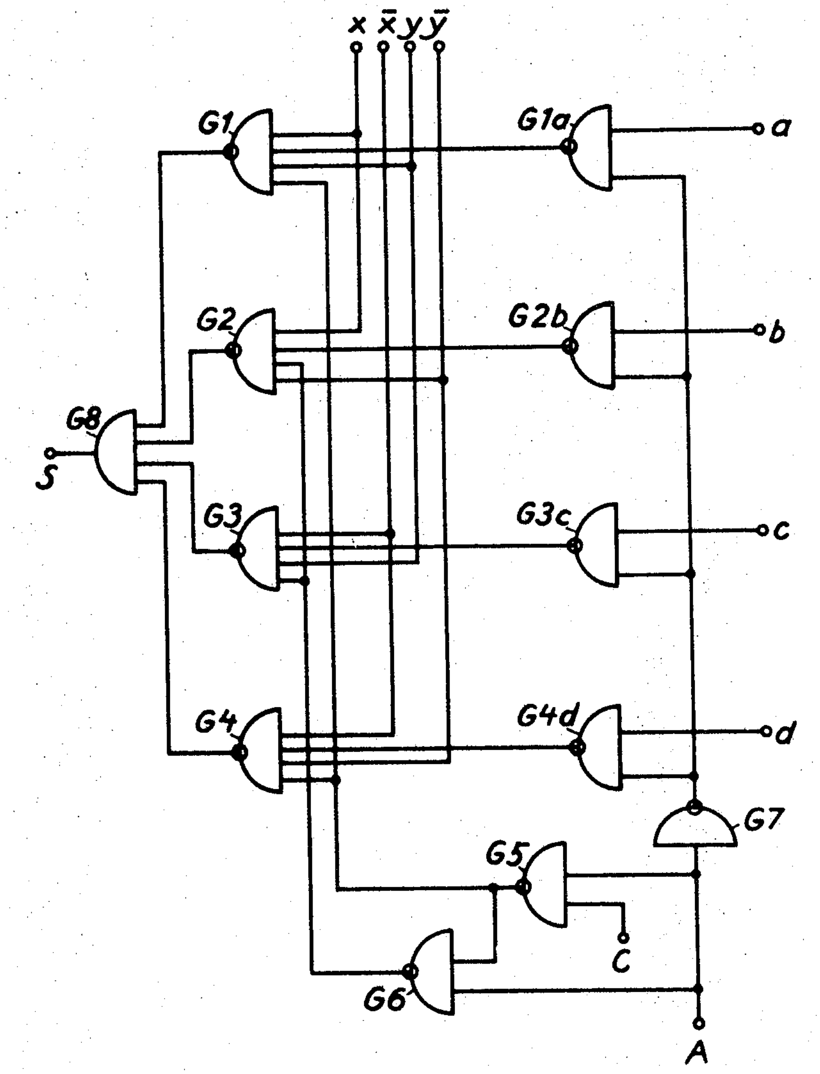

The invention will be described more in detail with reference to the accompanying drawing in which FIG. 1 shows a block diagram of an arrangement for summing and FIG. 2 shows how the additioning circuits included in the arrangement according to FIG. 1 are arranged according to the invention.

In FIG. 1 reference characters P*n*, P*n*+1 and P*n*+2 denote circuits which carry out summing in the positions *n*, *n*+1 and *n*+2, respectively, of two binary words and references B*n*, B*n*+1 and B*n*+2 denote the circuits that calculate a store or carry bit in the respective position. The contents of the respective positions of the binary words, labeled X*n*, X*n*+1 and X*n*+2 and Y*n*, Y*n*+1 and Y*n*+2, respectively, supplied to the inputs in FIG. 1 provided with the corresponding labels. As appears from the drawing the contents of the position of the words corresponding to the circuit as well as the store bit from the previous position are supplied to each circuit. The circuits P are then arranged so that they generate an output signal when there is an input signal at an odd number of inputs, and the circuits B generate an output signal when there is an input signal at more than one input, the binary words thus being added.

FIG. 2 shows how a circuit corresponding to any of the circuits P*n*, P*n*+1 or P*n*+2 in FIG. 1 is arranged according to the invention. X and Y denote the inputs to which the content in the position of the two binary words corresponding to the circuit is supplied and C denotes an input to which the store bit from the previous position is supplied. The circuit is furthermore provided with two inputs $\overline{X}$ and $\overline{Y}$ to which are supplied the complements of the variables X and Y. Furthermore, the circuit is provided with an input A, the input condition of which decides whether the circuit is to carry out summing or operate in accordance with the input conditions of a number of inputs *a*, *b*, *c* and *d* as will be more fully described below. The circuit comprises a first group of NAND gates G1—G4 and a second group of NAND gates G1*a*, G2*b*, G3*c* and G4*d*. Each of the last-mentioned gates has its output connected to one input of the corresponding gate of the first group. One input of the gates G1*a*, G2*b*, G3*c* and G4*d* is then connected to the inputs *a*, *b*, *c* and *d*, respectively, and the other input of these gates is connected to the input A via a NOT circuit G7. The inputs X and Y are connected to the gate G1, the inputs X and $\overline{Y}$ to the gate G2, the inputs $\overline{X}$ and Y to the gate G3 and the inputs $\overline{X}$ and $\overline{Y}$ to the gate G4. The fourth input of the gates G1 and G4 is connected to the output of a first further NAND gate G5, one input of which is connected to the input A and the other input of which is connected to the carry bit input C. The fourth input of each of the gates G2 and G3 is connected to the output of a second further NAND gate G6, one input of which is connected to the input A and the other input of which is connected to the output of the gate G5.

The operation of the arrangement described above appears from the following calculations in which the variables denote the binary condition on the respective inputs and the calculations are made in accordance with the laws of the Boolean algebra and by applying de Morgan's formulas in a known way. At the gate G7 the output signal $\overline{A}$ is obtained, which variable denotes the complementary value of the variable A. At the other gates, output signals are obtained according to the following table:

| Gate | Input signals | Output signals |
|---|---|---|
| G1a | $\overline{A}, a$ | $\overline{(a\cdot\overline{A})}=\overline{a}+A$ |
| G2b | $\overline{A}, b$ | $\overline{(\overline{A}\cdot b)}=A+\overline{b}$ |
| G3c | $\overline{A}, c$ | $\overline{(\overline{A}\cdot c)}=A+\overline{c}$ |
| G4d | $\overline{A}, d$ | $\overline{(\overline{A}\cdot d)}=A+\overline{d}$ |
| G5 | $C, A$ | $\overline{(C\cdot A)}=\overline{C}+\overline{A}$ |
| G6 | $\overline{C}+\overline{A}, A$ | $\overline{(\overline{C}+\overline{A})\cdot A}=C+\overline{A}$ |
| G1 | $X, Y, A+\overline{a}, \overline{C}+\overline{A}$ | $\overline{X\cdot Y\cdot(A+\overline{a})(\overline{C}+\overline{A})}=(\overline{X}+\overline{Y}+a\cdot\overline{A}+C\cdot A)$ |
| G2 | $X, \overline{Y}, A+\overline{b}, C+\overline{A}$ | $\overline{X\cdot\overline{Y}\cdot(A+\overline{b})(C+\overline{A})}=(\overline{X}+Y+b\cdot\overline{A}+\overline{C}\cdot A)$ |
| G3 | $\overline{X}, Y, A+\overline{c}, C+\overline{A}$ | $\overline{\overline{X}\cdot Y\cdot(A+\overline{c})(C+\overline{A})}=(X+\overline{Y}+c\cdot\overline{A}+A\cdot\overline{C})$ |
| G4 | $\overline{X}, \overline{Y}, A+\overline{d}, \overline{C}+\overline{A}$ | $\overline{\overline{X}\cdot\overline{Y}\cdot(A+\overline{d})(\overline{A}+\overline{C})}=(X+Y+d\cdot\overline{A}+A\cdot C)$ |

The four output signals from the gates G1—G4 constitute input signals to the AND gate G8, at the output S of which the following signal is obtained: $S=(\overline{X}+\overline{Y}+a\cdot\overline{A}+C\cdot A)(\overline{X}+Y+b\cdot\overline{A}+\overline{C}\cdot A)(X\overline{Y}+c\cdot\overline{A}+A\cdot\overline{C})(X+Y+d\cdot\overline{A}+A\cdot C)$.

If in this expression A is made equal to 1, that is a binary "one" is supplied to the input A, a signal is obtained at the output S corresponding to the following expression: $S=\overline{(\overline{X}+\overline{Y}+C)(\overline{X}+Y+\overline{C})(X+\overline{Y}+\overline{C})(X+Y+C)}=XYC+\overline{XY}C+X\overline{YC}+\overline{XYC}$, which expression is independent upon the variables *a*, *b*, *c* and *d* and gives a "one" on the output *S* when the number of "ones" supplied to the inputs *X*, *Y* and *C* is odd, that is the arrangement carries out binary summing.

If, on the other hand, a "zero" is supplied to the input *A*, the following expression is obtained for the signal at *S*: $S=(\overline{X}+\overline{Y}+a)(\overline{X}+Yb)(X+\overline{Y}+c)(X+Y+d)$,
which expression is independent of input *C* and different logical operations are obtained between the variables $X$ and $Y$. If, for example, $a=d=0$ and $b=c=1$ $S=(\bar{X}+\bar{Y})(X+Y)=\bar{X}Y+X\bar{Y}$ is obtained, which corresponds to an EXCLUSIVELY-OR-operation. In a corresponding way logical operations are obtained for different values of the variables $a$, $b$, $c$ and $d$ between the variables X and Y according to the following table:

Available logical functions

| a | b | c | d | S |
|---|---|---|---|---|
| 1 | 1 | 1 | 1 | 1 |
| 1 | 1 | 1 | 0 | $\bar{X}+\bar{Y}$ |
| 1 | 1 | 0 | 1 | $\bar{X}+Y$ |
| 1 | 1 | 0 | 0 | $\bar{X}$ |
| 1 | 0 | 1 | 1 | $X+\bar{Y}$ |
| 1 | 0 | 1 | 0 | $\bar{Y}$ |
| 1 | 0 | 0 | 1 | $X\cdot Y+\bar{X}\cdot\bar{Y}$ |
| 1 | 0 | 0 | 0 | $\bar{X}\cdot\bar{Y}$ |
| 0 | 1 | 1 | 1 | $X+Y$ |
| 0 | 1 | 1 | 0 | $X\cdot\bar{Y}+\bar{X}\cdot Y$ |
| 0 | 1 | 0 | 1 | $Y$ |
| 0 | 1 | 0 | 0 | $\bar{X}\cdot Y$ |
| 0 | 0 | 1 | 1 | $X$ |
| 0 | 0 | 1 | 0 | $X\cdot\bar{Y}$ |
| 0 | 0 | 0 | 1 | $XY$ |
| 0 | 0 | 0 | 0 | 0 |

By means of the arrangement according to the invention it is thus possible to carry out, by means of a very small number of circuits, either addition or summing of two binary words or one of a number of logical operation, whereby the operations can be carried out in different ways for different positions in the binary words.

We claim:

1. Arrangement for carrying out alternatively summing or one of a plurality of logical operations between the contents X and Y of a position of two binary words comprising four operand inputs (X, $\bar{X}$, Y, $\bar{Y}$) to which said binary contents and the complement of said contents, respectively, are supplied, four control inputs ($a$, $b$, $c$, $d$) the binary condition of which determines one of a maximum of 16 logical operations, a carry bit input (C), a summing determining input (A), a first group of four NAND circuits (G1$a$, G2$b$, G3$c$, G4$d$), one input of each of said circuits being connected to a different one of said control inputs, respectively, and the other input of each of said circuits being connected via a NOT circuit (G7) to said summing determining input (A), a second group of four NAND circuits (G1, G2, G3, G4), one input of each circuit of said second group being connected to the output of a different NAND circuit of said first group, two other inputs of each circuit of said second group connected to a combination, specific for each circuit, of two operand inputs, one from each word, the fourth input of the two NAND circuits of said second group, to which only complementary or only noncomplementary binary contents are supplied being connected to said summing determining input via a first further NAND circuit (G5) having one input connected to said carry bit input (C) and a second input connected to said summing determining input (A), a fourth input of the other two NAND circuits (G2, G3) of said second group being connected to the output of a second further NAND circuit (G6), one input of which is connected to said summing determining input (A), and the other input of which is connected to the output of said first further NAND circuit, an AND circuit, the outputs of each NAND circuit of said second group being connected to the inputs of said AND circuit (G8), and the output (S) of said AND circuit being the output of the arrangement.

2. A logic cell of a arithmetic unit for processing multiposition binary operands wherein the contents of a binary position of two binary operands are alternatively added or logical operated upon to carry out at least one logical function, said cell comprising first, second, third and fourth operand inputs, said first and second operand inputs receiving the contents and the complement of the contents, respectively, of the binary position of one of the two binary operands, said third and fourth operand inputs receiving the contents and the complement of the contents, respectively, of the other of the two binary operands, four NAND circuits, first and second inputs of a first of said NAND circuits being connected to said first and third operand inputs, respectively, first and second inputs of a second of said NAND circuits being connected to said first and four operand inputs, respectively, first and second inputs of a third of said NAND circuits being connected to said second and third operand inputs, respectively, first and second inputs of a fourth of said NAND circuits being connected to a second and fourth operand inputs, respectively, a summing control input adapted to receive a signal to indicate addition, a carry input, a first network of logical elements having first and second inputs and first and second outputs, said first and second inputs of said first network being connected to said summing control input and said carry input, respectively, said first output of said first network being connected to third inputs of said second and third NAND circuits, said second output of said first network being connected to third inputs of said first and fourth NAND circuits, said first logical network controlling said NAND circuits to perform binary addition operations only when a signal is present at said summing control input, a second network of logic elements having a first input connected to said summing control input, at least one other input and at least one output, said other input of said second network being adapted to receive a signal indicating a given logical function and said one output of said second network being connected to a fourth input of at least one of said NAND circuits, said second network controlling said NAND circuits to perform the operation for the given logical function only during the coincidence of the absence of a signal at said summing control input and the presence of the signal indicating the given logical function, and a four-input AND circuit, each input of said AND circuit being connected to the output of a different one of said NAND circuits and the output of said AND circuit being the output of said logic cell.

UNITED STATES PATENT OFFICE
CERTIFICATE OF CORRECTION

Patent No. 3,584,207 Dated June 8, 1971

Inventor(s) Oleg Avsan et al.

It is certified that error appears in the above-identified patent and that said Letters Patent are hereby corrected as shown below:

On the cover sheet [54] "2 Claims, No Drawings" should read -- 2 Claims, 2 Drawing Figs. --.

Signed and sealed this 7th day of December 1971.

(SEAL)
Attest:

EDWARD M.FLETCHER,JR.
Attesting Officer

ROBERT GOTTSCHALK
Acting Commissioner of Patents